UNITED STATES PATENT OFFICE.

CHARLES SCHMID, OF BRUSSELS, BELGIUM.

PROCESS OF MAKING ARTIFICIAL MUSK.

SPECIFICATION forming part of Letters Patent No. 602,961, dated April 26, 1898.

Application filed September 4, 1897. Serial No. 650,676. (No specimens.)

*To all whom it may concern:*

Be it known that I, CHARLES SCHMID, chemist, a citizen of Germany, residing at Brussels, Kingdom of Belgium, have invented certain new and useful Improvements in the Production of an Artificial Musk-Like Substance, fully described and represented in the following specification.

This invention relates to the production of a material or materials having the odor of musk. The method of preparation depends upon the oxidation of certain oily and wax-like products obtained from fossil resins—for instance, copal, amber, and retin resin. Copal, amber, or retin resin is subjected to distillation by means of superheated steam under pressure, a suitable enameled pot being employed. The various products of distillation are fractionated, the wax-like fraction and the specifically heavy oil being used for the subsequent treatment by oxidation. The distillation is facilitated by the addition to the resins enumerated of a quantity of magnesia just sufficient to render the fused mass feebly alkaline.

To carry out my process practically, I proceed as follows: Five kilos of copal are placed in an enameled vessel of distillation. Into this vessel superheated steam is conducted, and the temperature is raised until at 240° to 260° centigrade the heavy oils are driven off and at 260° to 300° centigrade the wax-like substances. These fractions are kept separately and may then be converted into the new musk-like body by oxidation. The wax-like substances give a better yield of musk-like matter than the heavy oils.

The oxidation is carried out as follows: One hundred grams of the heavy oil or wax-like substance are mixed with one kilogram of sulfuric acid of 66° Baumé, the acid being kept cold by a freezing mixture. One hundred grams of powdered potassium bichromate are then gradually added, with constant stirring of the acid solution. This operation should take about five hours.

In the place of potassium bichromate any other energetic oxidizing agent may be employed—for instance, an alkali chlorate, permanganate, or any similar substance freely giving off oxygen.

After the liquid has become cold and has become more or less clear it is filtered through an asbestos filter and then neutralized with a mixture of equal parts of ammonia and alcohol. If there is any excess of ammonia, this is removed by the addition of a drop or two of dilute sulfuric acid. The neutralized solution is then heated till all alcohol has been driven off. The liquid thus obtained possesses a delicate odor. The ordorous musk-like matters are separated from the liquid by means of ether, in which they are soluble. They are obtained by spontaneous evaporation of the ether in the form of an oily substance.

What I claim is—

1. The process for producing a musk-like substance consisting in subjecting to distillation with superheated steam certain fossil resins, such as copal, amber, or retin resin, treating the products of distillation of wax-like or oily consistence by reagents of oxidation, such as a mixture of bichromate of potassium and sulfuric acid, neutralizing the filtered mass by ammonia and alcohol, heating the neutralized solution until all alcohol has been driven off, and finally extracting from the thus-obtained matter the musk-like substance by means of ether, substantially as described.

2. As a new article of manufacture, a musk-like substance derived from resins, thus differing from all known artificial musk-like substances which are nitro derivatives of compounds belonging to the aromatic series, and having the following characteristics: being a heavy orange-red oil, soluble in sulfuric ether, spirits cologne, and vegetable oils, such as cotton-seed oil, insoluble in petroleum benzene; it is colored darker brown by concentrated sulfuric and nitric acid and concentrated alkalies, substantially as described.

In witness whereof I have hereunto set my hand in presence of two witnesses.

CHARLES SCHMID.

Witnesses:
H. R. HAMBURGER,
CARL FRÖHLICHE.